June 29, 1965 F. J. WEBBERE 3,191,252
COATING PROTECTION OF METAL SURFACES DURING CASTING
Original Filed Dec. 29, 1958
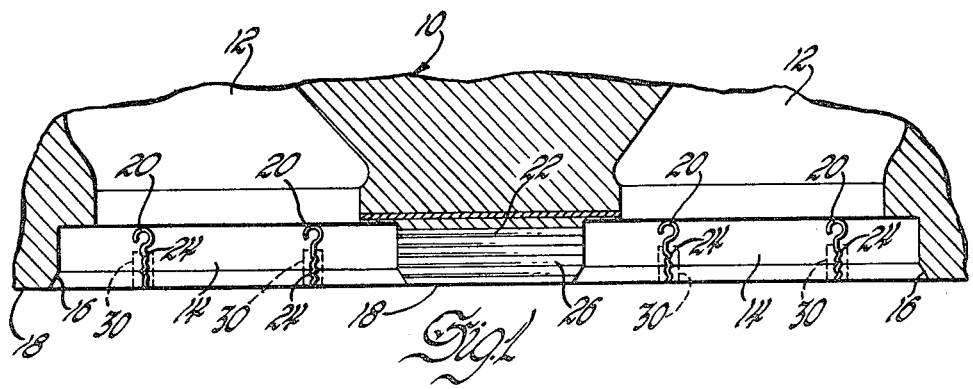
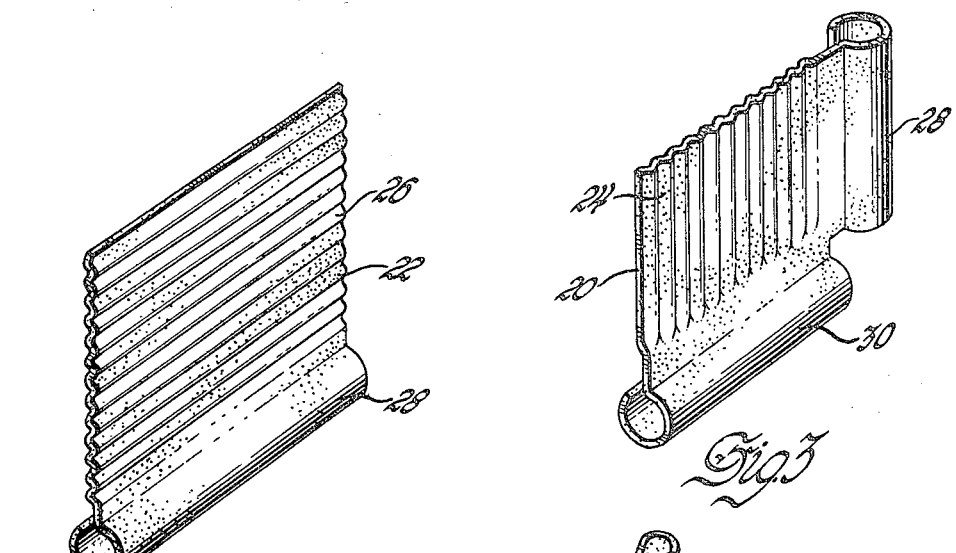
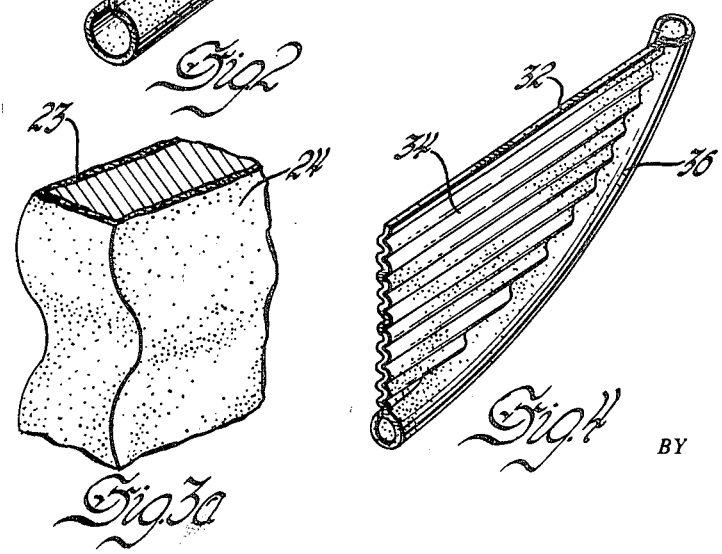
INVENTOR.
Fred J. Webbere
BY
G. N. Shampo
ATTORNEY 3,191,252
COATING PROTECTION OF METAL SURFACES
DURING CASTING
Fred J. Webbere, Commerce, Mich., assignor to General Motors Corporation, Detroit, Mich., a corporation of Delaware
Original application Dec. 29, 1958, Ser. No. 783,370, now Patent No. 3,045,301, dated July 24, 1962. Divided and this application Dec. 18, 1961, Ser. No. 159,847
7 Claims. (Cl. 22—216.5)

The present application is a division of my copending United States application, Serial No. 783,370, filed December 29, 1958, issued as Patent No. 3,045,301, granted July 24, 1962 and is owned by the assignee of the instant patent application.

This invention relates to an expansion joint for a member of a thermal device having a limited surface portion thereon subjected to rapid and extreme cyclic changes of surface temperature and a method of forming same. More particularly, the invention pertains to a method of making articles which have surfaces that are subject to severe cyclic thermal expansive and contractive conditions relative to the other surface and interior portions of the article, such as in internal combustion engines and the like.

The various surfaces defining a combustion chamber or cylinder of an internal combustion engine are subjected to rather severe cyclic thermal conditions due to the extremely rapid changes in temperature alternately imposed on these surfaces by the heats of compression and combustion and by the flow of relatively cool, gaseous charges into the cylinders during the engine operating cycle. These changes in surface temperature result in the cyclic composition of expansive, compressive and contractive, tensive stresses on these surfaces and the immediately adjacent layers of the various cylinder-defining members. In time these cyclic stresses result in fatigue cracking of these surfaces. Such cracking generally occurs intermediate and adjacent ports or openings in such members where the surface layer subjected to such cyclic stressing is of reduced dimension. Such cracking is also particularly prevalent in those applications where the engine is subjected to excessive fluctuations in load and speed; factors which result in sudden applications of relatively cool, incoming air onto overheated cylinder-defining surfaces.

This invention contemplates providing the combustion chamber surfaces of a thermal device of the type described with expansion joints similar in function to those shown and described in United States patent application Serial No. 650,249, now United States Patent No. 2,893,371, filed April 2, 1957, in the name of Vernon E. Schafer, Jr., entitled "Expansion Joint" and which is assigned to the assignee of the present invention. Such expansion joints are formed by casting metal inserts which are coated with a fusion-inhibiting material into the cylinder-defining members adjacent critical areas. These inserts intersect the combustion chamber surface and extend through the layer of the member normally subjected to such cyclic expansive and contractive thermal conditions. Under engine operating conditions, the initial expansive compression imposed on this surface layer stresses this layer beyond its compressive yield point for the temperatures involved and affects the formation of grooves immediately adjacent to and including the opposite sides of the insert. These grooves serve to accommodate and isolate subsequent expansion and contraction of the surface layer from the adjacent critical areas.

In casting steel inserts in a cast iron engine cylinder head for the above purpose, the carbon in the molten cast iron has a tendency to diffuse into the metal of the insert on contact. This diffusion of carbon changes the characteristics of the steel whereupon the insert has a tendency to melt and fuse with the cast iron, destroying the intended beneficial effects of individuality.

Accordingly, it is a primary object of my invention to provide a rapid and economical means to prevent this diffusion and to provide a method of economically casting a steel insert in a cast iron cylinder head so as to retain individuality of the insert.

Other objects, features and advantages of the present invention will become more apparent from the following description of preferred embodiments thereof and from the drawing, in which:

FIGURE 1 is a fragmentary sectional view of the exhaust port area in the cylinder head of an internal combustion engine of the uniflow, two-cycle, diesel type;

FIGURE 2 is a perspective view of one form of insert shown in FIGURE 1;

FIGURE 3 is a perspective view of a second form of insert, such as shown in FIGURE 1;

FIGURE 3a is an enlarged fragmentary sectional view of FIGURE 3; and

FIGURE 4 is a perspective view of a modified form of insert adapted for use in place of the insert shown in FIGURE 3.

Referring more particularly to the drawing, FIGURE 1 shows a portion of a cylinder head 10 of a uniflow, two-cycle, diesel engine. Each cylinder in the engine is provided with two exhaust passages 12 which are respectively connected to exhaust ports 14 which flank an opening (not shown) provided in the head for the nozzle of a fuel injector. The outer periphery 16 of the exhaust ports 14 is beveled to seat the heads of two exhaust valves (not shown) which are reciprocably mounted in the head.

As indicated above, the combustion chamber or fire deck surface 18 of the cylinder head of such an engine is particularly susceptible to surface cracking intermediate and adjacent the valve ports and injector nozzle opening. The cracking which occurs intermediate the injector opening and the exhaust ports is generally in a diametrical plane common to the several openings. The expansion and contraction of the fire deck surface parallel to this common diametrical plane also tends to develop sunburst-type cracking of the fire deck surface radially outwardly from the exhaust ports transversely of this common diametrical plane.

As shown in FIGURE 1, inserts 20 and 22 are cast into the cylinder head in accordance with the invention and serve to isolate the cyclic expansion and contraction of the combustion chamber surface from the critical areas intermediate and adjacent to the injector opening, the valve ports and other openings through the fire deck of the cylinder head. These inserts are of limited mass to prevent chilling during casting and, as shown in FIGURE 3a, have a coating 23 to prevent fusion of the insert with the molten metal during the casting process.

In the illustrative embodiments these inserts are first stamped into the structures shown from rolled sheet steel, are then coated, and cast in the cylinder head as hereinafter described. In the illustrative embodiments, the inserts 20 and 22 are arranged in pairs in parallel spaced relation flanking the critical areas intermediate the valve port openings 14, thereby serving to isolate the cyclic expansion and contraction of the remainder of the combustion chamber surface from these critical areas. The inserts 20 and 22 each have corrugated portions 24 and 26, respectively, normal to and intersecting the surface layer of the fire deck which defines the combustion chamber and is subjected to the the cyclic thermal conditions. The corrugations in the inserts extend parallel to the combustion chamber surface and interlock with the adjacent surfaces of the cylinder head. By using such corrugations, it has been found that such inserts can be used without increasing the thickness of the fire deck inasmuch as the interlocking, serrated surfaces carry the compression and combustion loads imposed on the adjacent portions of the fire deck.

The inserts 20 and 22 are terminated inwardly of the fire deck from their corrugated portions by rounded or cylindrically looped portions 28. These looped portions are open lengthwise to permit the free flow of molten metal within the loop during the casting process and serve to terminate the cracks formed in the head by the use of such inserts. The inserts 22 each have a single looped portion 28 which extends in parallel spaced relation to the combustion chamber surface and intersects the counter bores for the valve seat inserts at its opposite end. The inserts 20 are each rounded to provide two cylindrical or looped portions 28 and 30 formed at right angles to each other. The looped portion 30 is normal to and intersects the combustion chamber surface at one end, and the looped portion 28 extends in parallel spaced relation to the combustion chamber surface and intersects the adjacent valve port 14 at its end opposite the looped portion 30.

Under normal engine operating conditions, the cyclic expansion of the surface layer of the head adjacent the combustion chamber affects the formation of narrow grooves (not shown) and in the surface of the casting immediately adjacent the inserts 20 and 22, respectively. Since the compressive stresses resulting from such cyclic expansion exceed the yield points of the insert and head materials at the temperatures involved, these grooves are formed in part by the outward extrusion of a portion of the insert and in part by the permanent upsetting of the adjacent surface layer. The grooves are thus formed during the initial or breaking-in period of engine operation to the depth of this surface layer subjected to cyclic thermal conditions and are adapted to accommodate subsequent expansive and contractive plastic flow of this surface layer without imposing further compressive and tensive stresses on the critical areas of the head intermediate the inserts.

A third form of insert 32 is shown in FIGURE 4. This insert is generally triangular in shape and particularly designed for use in applications similar to that for which the inserts 20 and 22 are used in the above-described embodiment. As shown, the insert 32 has a portion 34 corresponding to the portion 24 of insert 20 and having corrugations intended to provide interlocking surfaces parallel to the combustion chamber surface of the fire deck. A rounded bead 36 is formed arcuately and generally diagonally of the corrugations and is adapted to terminate the insert created "crack"; intersecting the exhaust port 14 at one end and the surface 18 of the combustion chamber at its other end.

In accordance with my invention, the formed insert is coated with a mixture of powdered aluminum or a powdered aluminum base alloy, levigated, or powdered, alumina and a carrier, which preferably functions as a binder. A sufficient quantity of the coating mixture is applied to form a coating having a thickness of at least 0.0005 inch by spraying, dipping, rolling, brushing or the like. The maximum thickness of a coating which can be used is dependent upon the particular application and, in general, a variety of coating thicknesses above about 0.0005 inch can be used. The thickness of the coating generally is limited only by that thickness which will tend to impair surface detail on the insert, but in some instances exceedingly heavy deposits may tend to be chipped off readily in handling and are, therefore, undesirable. Coating thicknesses of approximately 0.0005 inch to 0.0015 inch can be used for most applications without impairing surface detail.

After the coating is applied, it is dried so that the insert can be readily handled prior to the casting operation without detrimentally affecting the coating, such as by scratching, nicking, etc. Although the coating can be dried at room temperature, it is preferred to accelerate the drying by heating at elevated temperatures. When using a suitable silicone resin or tributyltitanate as the carrier, the coating is preferably dried at temperatures from about 200° F. to 500° F. for about 10 to 20 minutes.

I have found that successful results are obtained when using a mixture containing approximately 20% to 40%, by weight, aluminum or aluminum base alloys and levigated alumina in amounts from approximately 5% to 10%, by weight. In some instances, amounts of alumina as high as approximately 20%, by weight, are preferred. In referring to aluminum base alloys, I intend to encompass alloys containing at least about 80% aluminum.

The particle size of the aluminum or aluminum base alloys, as well as the alumina are preferably of such a size that they can be readily dispersed in a suitable carrier and do not readily settle out. Generally, I prefer to use particle sizes of at least about 2 microns since particles of smaller size tend to form aggregates which are not readily broken during the mixing, thus inhibiting dispersion of the individual particles in the carrier.

Generally, aluminum or aluminum base alloys which have a particle size that will pass through a standard 400 mesh screen but which have an average minimum mean diameter of about 2 microns can be used. Particle sizes of the aluminum or aluminum base alloys in excess of about 400 mesh tend to be exceedingly inefficient in maintaining separation of the aluminum particles and are quite difficult to maintain in uniform dispersion. Such particles tend to settle out quite rapidly from the mixture.

Since the alumina is quite important in preventing the wetting of the surface of the insert by the molten casting metal, it is important that the size of the alumina particles be maintained fairly small. I have found that levigated alumina having particle sizes of approximately 2 microns to 10 microns provide generally satisfactory results.

The carrier for the alumina and aluminum base alloys or aluminum which is to be used can be of any type which will function satsfactorily in the given application. The carrier preferably acts as a binder for the particles, making them adhere to the surface of the insert. In some instances, the carrier can be composed of binder plus a volatile solvent which is used to thin the mixture. Although a binder is generally preferred for the carrier, in some instances the carrier can be only a volatile solvent.

However, in instances where the inserts must be handled to some extent before the casting operation and in which handling the parts may be subjected to some abuse, it is essentially desirable that the aluminum and aluminum oxide be supported in a carrier which has bonding or adhesive characteristics. Especially satisfactory results have been obtained using tributyltitanate and polyorganosiloxanes as carriers which have bonding characteristics. Alkyl-aryl and dialkyl polyorganosiloxanes, such as a phenyl methyl polysiloxane or a dimethyl polysiloxane, each having a molecular weight in the nature of about 1400 to 1600, is generally useful.

Volatile solvents, such as acetone, alcohol, methyl ethyl ketone, can be used to thin the mixture so that it can be handled more readily. When using tributyltitanate as a binder, however, extreme care must be employed to avoid using a thinner which has excessive moisture therein since mixture of such a thinner with tributyltitanate tends to decompose the tributyltitanate.

As a specific example of my invention inserts, such as hereinbefore described, made of SAE 1008 steel can be cast in a uniflow, two-cycle, diesel engine cylinder head having a composition which is as follows, all percentages by weight:

| | |
|---|---|
| Carbon | 3.25% to 3.50%. |
| Silicon | 2.0% to 2.5%. |
| Manganese | 0.4% to 0.8%. |
| Sulfur | 0.1% Maximum. |
| Phosphorus | 0.05% Maximum. |
| Chromium | 0.3% Maximum. |
| Nickel | 0.3% Maximum. |
| Iron | Balance. |

An insert of SAE 1008 steel which is placed in contact with a molten cast iron alloy, such as described above, readily absorbs carbon from the molten alloy. The melting point of the steel is reduced to such an extent that the steel insert is melted and blends with the cast iron, destroying the individuality of the insert necessary to obtain the benefits of the invention.

However, I have found that such action was eliminated by dipping the insert into a liquid mixture containing 25 milliliters of tributyltitanate, 15 grams aluminum powder and 3 grams levigated alumina. After dipping the part in the mixture, the part was shaken vigorously to remove excessive amounts of the coating mixture and subsequently dried for 15 minutes at approximately 300° F. The part was subsequently located in a cylinder head mold in spaced relationship to form the cylinder head previously described. Generally, any type of mold can be used which is suitable for the casting of cylinder heads without inserts. The inserts are maintained in position in the mold in the normal and accepted manner for casting inserts. Typically, the mold cavity surface can be grooved and the inserts placed therein. With the inserts in the mold, the molten cast iron is introduced to form the cylinder head.

After the casting operation, the mold members were removed in a conventional manner leaving the resultant head casting accessible for further treatment. The casting was then cleaned and subsequently machined in the usual manner to the finished fire deck surface and valve ports, as shown in FIGURE 1. These machining operations, of course, insure that the inserts properly intersect the finished surfaces of the head.

In some instances this invention is preferred for casting other types of steel inserts in cast iron articles. This invention has been especially satisfactory in forming cast iron castings which have exceedingly complex passages therein. Finished castings of this type are frequently not easily made using conventional coring techniques. In such instances, it may be desirable to coat, in a manner such as herein described, the exterior of a tubular member which is preformed to the desired contour of the passage in the casting. The coated, preformed tubing is then suitably located in a mold and the molten casting metal introduced. In this maner highly satisfactory results are obtained which cannot be readily obtained by conventional coring methods.

It is also contemplated that, in some instances, the subject mixture is especially satisfactory when used as a core wash in the known and accepted manner. Under some circumstances it is desirable to coat the mold cavity-defining surface of a chill in a mold. In such event the subject type mixture provides an especially satisfactory coating which inhibits wetting of the chill and diffusion across the interface between the chill and the molten casting metal.

Although this invention has been described in connection with certain specific examples thereof, no limitation is intended thereby except as defined in the appended claims.

I claim:
1. A method of casting which comprises applying a coating to a surface of a part which is to be in contact with a molten metal, said coating comprising, by weight, about 20% to 40% of a powdered metal from the group consisting of aluminum and aluminum base alloys, 5% to 20% of levigated alumina and about 40% to 75% of a carrier from the group consisting of polyorganosiloxanes and tributyltitanate, said metal having a particle size of from about 400 mesh to about 2 microns, said alumina having a particle size of approximately 2 microns to 10 microns, drying said coating and casting molten metal against the surface of said part.

2. The method described in claim 1 in which the carrier is tributyltitanate.

3. A method of casting which comprises applying a coating having a thickness of at least 0.0005 inch to a surface of a part which is to be in contact with a molten metal, said coating comprising, by weight, about 20% to 40% of a powdered metal from the group consisting of aluminum and aluminum base alloys, 5% to 20% of levigated alumina and about 40% to 75% of a carrier from the group consisting of phenyl methyl polysiloxane, dimethyl siloxane and tributyltitanate, drying said coating and casting molten metal against the surface of said part.

4. A method of casting which comprises coating a surface of a part with a mixture which comprises approximately, by weight, about 20% to 40% of a powdered metal from the group consisting of aluminum and aluminum base alloys, about 5% to 20% levigated alumina and about 40% to 75% of a binder to form a coating having a thickness of at least 0.0005 inch, said metal having a particle size of from about 400 mesh to approximately 2 microns, drying said coating, placing said part in a mold and introducing molten metal into said mold so as to be in contact with said coated surface.

5. A method of casting which comprises coating a surface of a part with a mixture which comprises approximately, by weight, about 20% to 40% of a powdered metal from the group consisting of aluminum and aluminum base alloys, about 5% to 20% levigated alumina and about 40% to 75% tributyltitanate to form a coating having a thickness of at least 0.0005 inch, said metal having a particle size of from approximately 400 mesh to about 2 microns, said aluminum having a particle size of about 2 microns to 10 microns, drying said coating, placing said part in a mold and introducing molten metal into said mold so as to be in contact with said coated surface.

6. A method of casting which comprises coating a part with a mixture which comprises approximately, by weight, about 20% to 40% of a powdered metal from the group consisting of aluminum and aluminum base alloys, about 5% to 20% levigated alumina and about 40% to 75% of a carrier from the group consisting of phenyl methyl siloxane, dimethyl siloxane and tributyltitanate to form a coating having a thickness of about 0.0005 inch to 0.0015 inch, said metal having a particle size of from approximately 400 mesh to about 2 microns, said alumina having a particle size of about 2 microns to 10 microns, drying said coating, placing said part in a mold and introducing molten metal into said mold so as to be in contact with said coated surface.

7. A method of casting which comprises coating a cylinder head mold steel insert with a mixture which comprises approximately, by weight, about 20% to 40% of a powdered metal having a particle size of from approximately 400 mesh to about 2 microns from the group consisting of aluminum and aluminum base alloys, about 5% to 20% levigated alumina having a particle size of about 2 microns to 10 microns, and about 40% to 75% of a binder to form a coating having a thickness of at least 0.0005 inch, drying said coating, placing said part in a cylinder head mold and introducing molten cast iron into said mold so as to cast said molten cast iron around said coated insert.

References Cited by the Examiner

UNITED STATES PATENTS

| | | | |
|---|---|---|---|
| 2,507,068 | 5/50 | Underwood | 117—5.3 |
| 2,599,185 | 6/52 | Lepp et al. | 106—65 |
| 2,872,715 | 2/59 | Bean | 22—202 |
| 2,875,485 | 3/59 | Schneider | 22—193 |
| 2,903,375 | 9/59 | Peras | 117—5.3 |
| 2,975,494 | 3/61 | Cooper | 106—38.35 |

FOREIGN PATENTS 584,160  1/47  Great Britain.

MICHAEL V. BRINDISI, *Primary Examiner.*

MARCUS U. LYONS, *Examiner.*